United States Patent [19]

Jessup

[11] 4,148,462
[45] Apr. 10, 1979

[54] TREE FELLING DEVICE

[76] Inventor: Samuel A. Jessup, 1613 Pinedale Dr., Raleigh, N.C. 27603

[21] Appl. No.: 917,461

[22] Filed: Jun. 21, 1978

[51] Int. Cl.² ............................................. B66F 3/24
[52] U.S. Cl. ............................................. 254/133 R
[58] Field of Search ............. 254/133, 108; 144/34 A

[56] References Cited

U.S. PATENT DOCUMENTS

| 1,325,963 | 12/1919 | Templeton | 254/133 R |
| 1,410,380 | 3/1923 | Daniels | 254/133 R |
| 3,685,800 | 8/1972 | Schock | 254/133 R |

Primary Examiner—Robert C. Watson
Attorney, Agent, or Firm—Mills & Coats

[57] ABSTRACT

The present invention relates to a tree felling device adapted to engage a tree being cut down and to exert a force thereagainst in a particular direction in order to assure that the tree will fall in a selected area. The tree felling device of the present invention includes a jacking device of the basic bumper jack type which is adapted to support an elongated pusher having a tree engaging head secured at one end thereof and which is preferably tied to the tree to be cut. As a part of the jacking device, there is provided a ratchet mechanism having an anchoring stud secured thereto for generally receiving and stabilizing one end of said pusher while the jacking assembly is provided with a support clip about the top portion thereof for holding the pusher.

5 Claims, 5 Drawing Figures

TREE FELLING DEVICE

The present invention relates to tree felling devices and more particularly to a hand actuated tree felling device of the jack type wherein by the use of a jack assembly in cooperation with a pusher, the tree is engaged and pushed, while being cut, by the force of the jack in a desired direction.

BACKGROUND OF INVENTION

For many years tree felling devices have been utilized to direct trees being cut down to a selected area. This is particularly important where a tree is being cut down and lies close to a house, structure, or other area where it would be unsafe or undesirable for trees to fall.

Tree felling devices of the prior art have been of various types. For example, tree felling devices have been incorporated into self-propelled timber harvesters. Although such tree felling devices may have proved to be satisfactory, it is obvious that such are not particularly suited for use by an individual who simply needs assistance in felling a tree around his house or in other like situations.

There have been attempts to design a simple, relatively inexpensive tree felling device that would be particularly suited for use by homeowners and other individuals whose needs are not as sophisticated as those found in heavy duty tree harvesting equipment. Although there has been attempts to design a simple and relatively inexpensive tree felling device, many such devices have not in the end turned out to be simple and inexpensive. To the contrary, many such tree felling devices have in the end become complicated and expensive, as well as difficult to use and troublesome to maintain.

SUMMARY OF INVENTION

The present invention entails a tree felling device that is adapted to be used by a single individual and which is relatively simple and inexpensive, and which is particularly reliable in directing a falling tree being cut to a desired area. More particularly, the tree felling device of the present invention is a jack actuated tree felling device that in use is positioned adjacent the tree, and a pusher and tree engaging head associated therewith is directed from the jacking assembly with the tree engaging head being tied to the tree by chain or the like to prevent slipping. Once the tree is partially cut by a chain saw or the like, the jack is utilized to exert a pressure thereagainst in the direction of the intended fall. By jacking, the tree felling device is able to apply a force against the tree and to generally cause the same to fall in a desired area away from a surrounding house or structure.

It is, therefore, an object of the present invention to provide a relatively simple and inexpensive portable jack actuated tree felling device that is effective.

Another object of the present invention resides in the provision of a portable tree felling device that is easy to properly set adjacent a tree, and which can easily be moved from one location to another.

A further object of the present invention is to provide a portable jack type tree felling device that is comprised of a jacking assembly and a pusher and head for engaging a tree to be cut, wherein the tree felling device is provided with means for conveniently attaching and supporting said pusher and head to said jacking assembly.

Still a further object of the present invention is to provide a tree felling device of the character described above wherein the tree felling device is capable of accurately pushing the tree being cut to a desired area.

It is also an object of the present invention to provide a tree felling device that may operate to engage a tree being cut and to direct that tree to a desired area from various angles with respect to a tree.

Finally it is an object of the present invention to provide a portable jack actuated tree felling device that is designed to securely engage a tree being cut such that when the tree is pushed the tree felling device will not substantially slip with respect to the tree.

Other objects and advantages of the present invention will become apparent from a study of the following description and the accompanying drawings which are merely illustrative of the present invention.

DESCRIPTION OF PREFERRED EMBODIMENT

Figure 1:
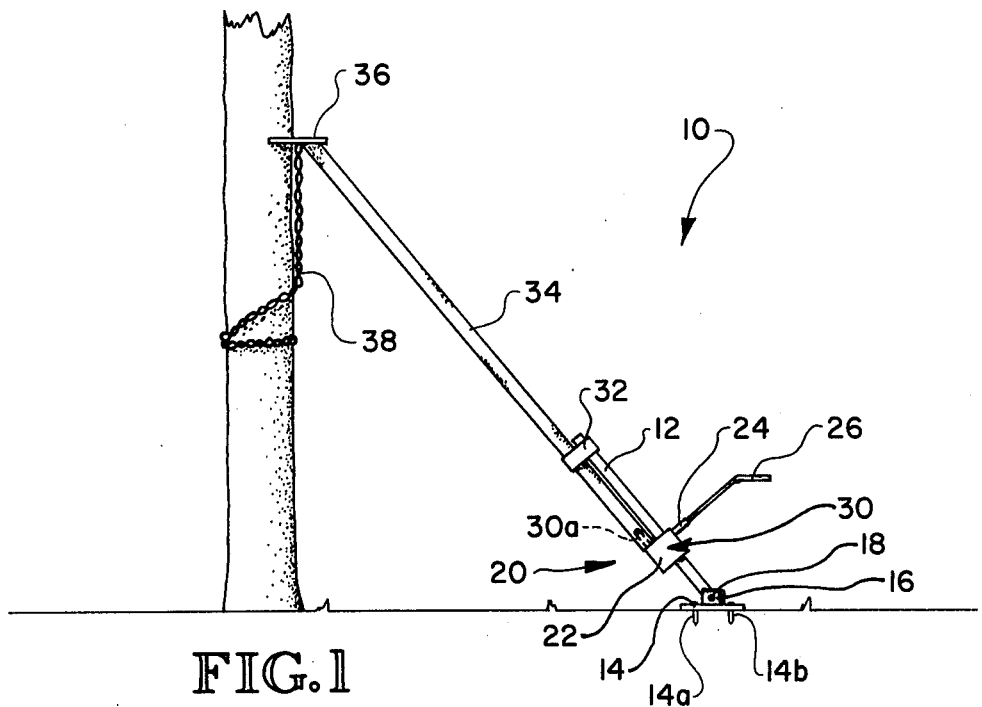
FIG. 1 is a side elevational view of the tree felling device of the present invention engaged with a tree.

With further reference to the drawings, the tree felling device of the present invention is shown therein and indicated generally by the numeral 10. Tree felling device 10 is of the portable jack type and can easily be handled by a single individual to push and direct trees being cut in a certain direction. Viewing tree felling device 10 in more detail, it is seen that the same includes a hand actuated jack type base including an elongated rack 12 that is pivotably mounted to a support plate 14. Support plate 14 includes a pair of pivot plates 16 that are secured to rack 12 through a pivot pin 18. Plate 14 may be anchored to the ground by a pair of spikes 14a and 14b that are adapted to extend through openings within plate 14 into the ground. The rack 12 is of the type having vertically spaced teeth formed therealong for receiving a ratchet advancing mechanism indicated generally by the numeral 20. The ratchet advancing mechanism 20 is of the type that forms a part of a conventional bumper jack and which cooperates with the rack 12. It is appreciated that by actuating the ratchet advancing mechanism 20 that the same can be moved up and down along the rack 12 in a conventional manner. Because rack 12 and the ratchet advancing mechanism 20 is conventional in bumper jacks, a detailed discussion of the structure thereof will not be dealt with herein because such details are not in themselves per se to the present invention and because the structure and function thereof is well appreciated in the art. But for the sake of a general understanding of the present invention, it is seen that the ratchet advancing mechanism 20 includes a frame 22 that generally surrounds rack 12 and includes a handle 24 extending therefrom that is adapted to receive a hand actuated lever 26.

It is appreciated that internally within the frame 22 there is a reversible ratchet advancing mechanism for engaging the teeth on rack 12 for causing the frame 22 to be moved up and down the rack. Details of this ratchet advancing mechanism is not shown herein because such is conventional within bumper jacks, and the structure and manner of operation is well appreciated by those skilled in the art.

Figure 4:
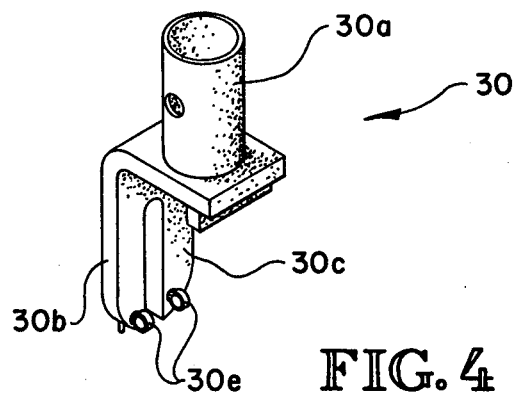
FIG. 4 is a perspective view of the anchoring stud assembly.
Figure 5:
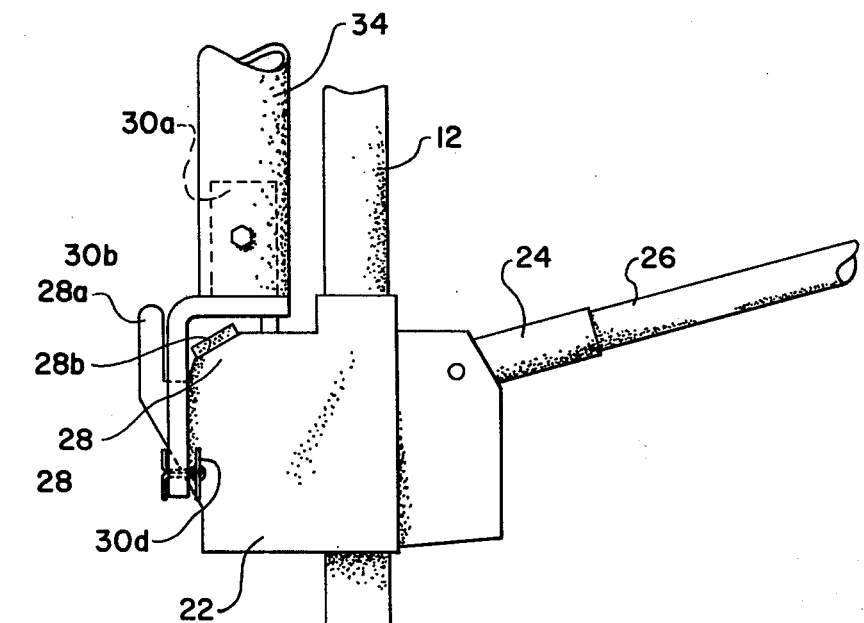
FIG. 5 is a fragmentary side elevational view of the jacking mechanism of the present invention.

Forming a part of frame 22 is a heel section 28 that includes a bumper insert 28a and a seat area 28b (FIG. 4) and which is adapted to receive and support an anchoring stud assembly indicated generally by the numeral 30.

Anchoring stud assembly 30 includes an anchoring stud 30a and a pair of spaced apart legs 30b and 30c that straddle and rest on the heel portion 28 of frame 22 and which are connected to frame 22 by a transverse cotter key 30d that extends through frame 22 and through the top loop of two other cotter keys 30e that extend through legs 30b and 30c.

Fastened to the upper portion of rack 12 is a support clip 32 that includes an opening therethrough. Extending through the support clip 32 is an elongated pusher 34 that is constructed of pipe or the like and which can be of any preferred length. Pusher 34 about its lowermost end includes a receiving opening for receiving the anchoring stud 30a. Consequently, it is appreciated that when pusher 34 is received within the clip support 32 and inserted about the anchoring stud 38 that the pusher 34 can be generally stationarily held by the tree felling device 10 of the present invention and particularly by the lower jacking assembly thereof.

Secured to a top portion of pusher 34 is a head plate 36 that includes an arcuate shaped face 36a for engaging a particular tree to be cut.

To prevent the head 36 from slipping along the tree, a flexible tie 38 in the form of a chain is secured to the head 36 and in practice is generally wrapped around the tree and hooked so as to achieve a firm tie or hold to the tree.

Figure 2:
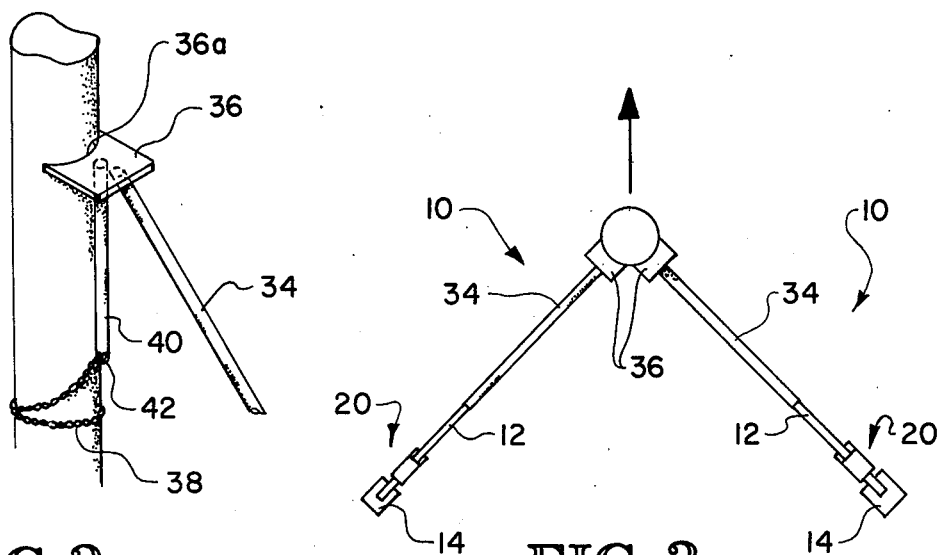
FIG. 2 is a fragmentary perspective view of an alternate head assembly for the tree felling device.

With reference to FIG. 2, an alternate embodiment is shown and in this embodiment, about the head 36 there is provided an elongated tie bar 40 that extends downwardly therefrom at an angle with respect to pusher 34. About the lowermost end of the tie bar 40, there is provided an attaching ring 42 for receiving the flexible tie 38. In the case of this embodiment, the flexible tie or chain 38 is threaded through or secured to the ring 42 and around the tree to be cut and pushed in a desired direction, so as to prevent head 36 from slipping about the tree.

In operation, the tree felling device of the present invention is attached to a tree to be cut down as illustrated in FIGS. 1 and 2. It is to be appreciated that tree felling device should be positioned such that the tree felling device is placed on the opposite side of the tree in the direction it is desired for the tree to fall once cut. In other words, the face 36a of head 36 is positioned such that it faces in the direction desired for the tree to fall. Generally, to assure for a safe and proper tree felling operation, the tree would first be notched out on the side opposite the head 36, in conventional fashion. Then, the tree is cut from the side of the tree opposite the notched portion such that the tree would fall into and towards the notch and directly away from head 36 as the tree felling device 10 is actuated. By actuating, it is meant that a force is applied to the tree being cut down by jacking or moving the ratchet advancing mechanism 20 about rack 12. It is appreciated that this upper movement causes pusher 34 through head 36 to apply a force on the tree in the desired direction of fall.

Figure 3:
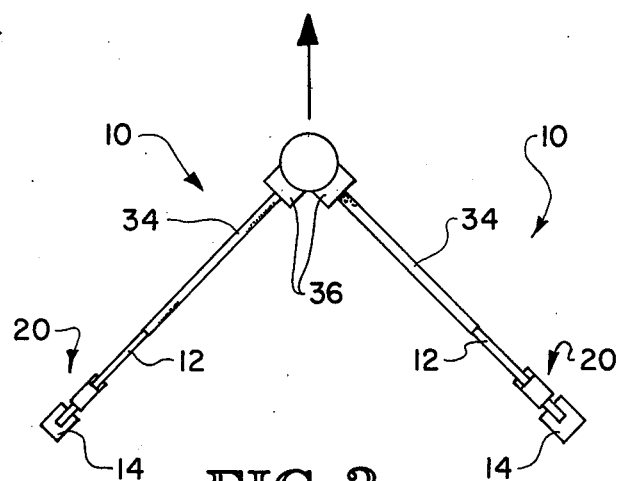
FIG. 3 is a top plan view of two tree felling devices of the present invention engaged with a tree in a cooperative manner for directing the tree towards a certain direction.

In certain cases it might be beneficial to utilize two tree felling devices 10 simultaneously to achieve a desired resultant fall direction because of an obstacle or because the tree may be significantly leaning in a direction away from the direction desired for the tree to fall. In such a case, as illustrated in FIG. 3, two tree felling devices can be utilized simultaneously to achieve a resultant direction that in effect is the summation of the directions of the two tree felling devices as would be determined through vector analysis.

From the foregoing specification, it is appreciated that the tree felling device of the present invention presents a relatively simple and inexpensive tree felling device that is reliable and efficient and which can be conveniently handled and operated by a single individual. The use of the tree felling device 10 such as shown in the present disclosure enables one individual to be able to control the direction of fall of the tree to avoid houses and other structures and in the end allows certain trees to be cut and felled in an inexpensive manner without incurring substantial expense in cutting the tree from the top to the bottom in small sections.

The terms "upper", "lower", "forward", "rearward", etc, have been used herein merely for the convenience of the foregoing specification and in the appended claims to describe the tree felling device and its parts as oriented in the drawings. It is to be understood, however, that these terms are in no way limiting to the invention since the tree felling device may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. A tree felling device comprising: a ratchet type jacking assembly including an elongated rack; a jacking mechanism operatively engaged with said rack and movable vertically about said rack and including a ratchet advancing assembly having a handle extending therefrom for actuating the same such that said jacking mechanism can be moved up and down said rack; a support plate pivotably secured to said rack by a pivot pin that allows said rack to extend from said support plate at various angles; said jacking mechanism including an outwardly projecting heel and an anchoring stud secured thereto and projecting upwardly therefrom, said anchoring stud including two spaced apart legs adapted to straddle said heel and secured thereto by attaching means operatively interconnected between said legs and said heel; a support clip secured to the top portion of said rack and generally aligned with said heel and anchoring stud, and including an opening formed therein adjacent said racks; an elongated pipe like pusher having one end with a stud receiving opening therein for receiving said anchoring stud; and wherein said support clip is adapted to receive and hold said pusher through the defined opening thereof such that said elongated pusher may be supported about said heel and confined adjacent said rack by said anchoring stud and allowed to project upwardly therefrom through said support clip; a tree engaging head secured to the end of said pusher opposite said stud receiving opening and including an arcuate shaped tree engaging face; and a flexible tie normally attached to said tree engaging head and tied around a tree being engaged to generally prevent the head from slipping along the tree as falling pressure is applied by said jacking assembly.

2. The tree felling device of claim 1 wherein there is provided a tie bar secured in the vicinity where said pusher joins the tree engaging head, and wherein said tie bar extends downwardly therefrom and includes a lower end that is secured to said flexible tie such that the tree felling device can be anchored to a particular tree by the flexible tie secured to the tying end of said tie bar.

3. The tree felling device of claim 1, wherein said support clip includes a relatively thin band secured to the top portion of said rack so as to define an opening therethrough.

4. The tree felling device of claim 1, wherein said support plate includes a pair of spaced apart holding plates secured about the top thereof and adapted to receive said pivot pin therethrough for pivotably supporting said rack.

5. The tree felling device of claim 1, wherein said tie end of said tie bar includes a ring type opening secured thereto for receiving said flexible tie therethrough.

* * * * *